United States Patent [19]
St. Paul

[11] 3,948,207
[45] Apr. 6, 1976

[54] OUTPUT AIR SUPPLY HAZARD ANNUNCIATOR

[75] Inventor: Roy St. Paul, New Orleans, La.
[73] Assignee: Raymond K. Goode Co., Inc., Metairie, La.
[22] Filed: Apr. 10, 1974
[21] Appl. No.: 459,629

[52] U.S. Cl. .................. 116/65; 116/4; 137/557
[51] Int. Cl.² ................................. G01L 19/12
[58] Field of Search............. 116/65, 4, 70, 117 R; 73/431; 128/142.2; 137/557; 235/201 R, 201 ME

[56] References Cited
UNITED STATES PATENTS

| | | | |
|---|---|---|---|
| 2,641,689 | 6/1953 | Poitras | 116/65 X |
| 3,204,653 | 9/1965 | Hettlinger | 137/557 X |
| 3,288,165 | 11/1966 | Cranage | 73/389 X |
| 3,348,772 | 10/1967 | Chabrier et al. | 235/201 ME |
| 3,380,430 | 4/1968 | Hogel | 137/557 X |
| 3,682,129 | 8/1972 | Phillbrick | 116/65 |

Primary Examiner—Richard C. Queisser
Assistant Examiner—Daniel M. Yasich
Attorney, Agent, or Firm—Calvin J. Laiche

[57] ABSTRACT

The present invention provides an air breather annunciator for supplying and regulating a source of air to a remote operational station to be employed by, for example, a sand blaster working within a polluted air environment. The device basically comprises an air storage capacitor operably connected to an air supply and which in turn feeds a source of air through output regulator to an operational station requiring a source of air. Alarm means is provided for the visual and audio indication of either low pressure air supply or interruption thereof. Alarm circuit check means are also provided for manually checking both the visual and audio alarm circuits.

7 Claims, 2 Drawing Figures

OUTPUT AIR SUPPLY HAZARD ANNUNCIATOR

BACKGROUND OF THE INVENTION

The present invention pertains to those arts concerned with devices for supplying and/or regulating a source of clean air to a remote operational station where the atmosphere is polluted and cannot be consumed by a human being performing various tasks at that station.

There are numerous job requirements in industry which require that a worker perform tasks in a hazardous or polluted air atmosphere. Accordingly, it is quite often necessary and even mandatory for many such assignments that the worker employ a hood or air breathing apparatus which in turn is connected to a source of clean air that is piped to the worker. Typical of such assignments is that of a sand blaster or a painter working within a confined area and/or using a dangerous coating material. Other typical applications are, for example, the necessity of a worker entering a contaminated area such as encountered in a petrochemical plant where dangerous fumes have leaked in the area and an operator must enter that area in order to shut down or check certain equipment. There are diverse other applications and work assignments which require the use of an external supplied source of air.

It is common practice in many industries, both as a requirement of a particular company and/or required by the safety laws, that another worker be stationed some distance away and in sight of the worker employing the air breathing apparatus so that if failure of the air supply should occur, or for some reason the worker may injure himself and lose control of his air breathing apparatus, or for any other reason that could endanger the life of the worker, then the safety worker can then institute a necessary rescue operation. There are many applications where the only essential function of the worker standing guard is to give an immediate alarm or indication to the worker with the air breathing device if and when the air pressure should be reduced and/or interrupted. An object of the present invention is to provide a device whereby a worker working in a hazardous or polluted air atmosphere which requires the use of an auxiliary air breathing device, can be very quickly and adequately warned of any reduction and/or interruption of his air supply. Among the distinct advantages and features of the present invention is its simplicity and relatively low cost of manufacture coupled with the ease by which it can be readily checked by an operator to ascertain its proper working order. These objects and distinct advantages and features of the present invention will become evident to one skilled in the art in light of the ensuing detailed disclosure of its preferred embodiment and as particularly pointed out in the amended claims.

BRIEF DESCRIPTION OF THE DRAWINGS

In the two sheets of drawings illustrating the preferred embodiment of the present invention, synonymous reference numerals are used to refer to identical components.

DESCRIPTION OF THE PREFERRED EMBODIMENT

Figure 1:
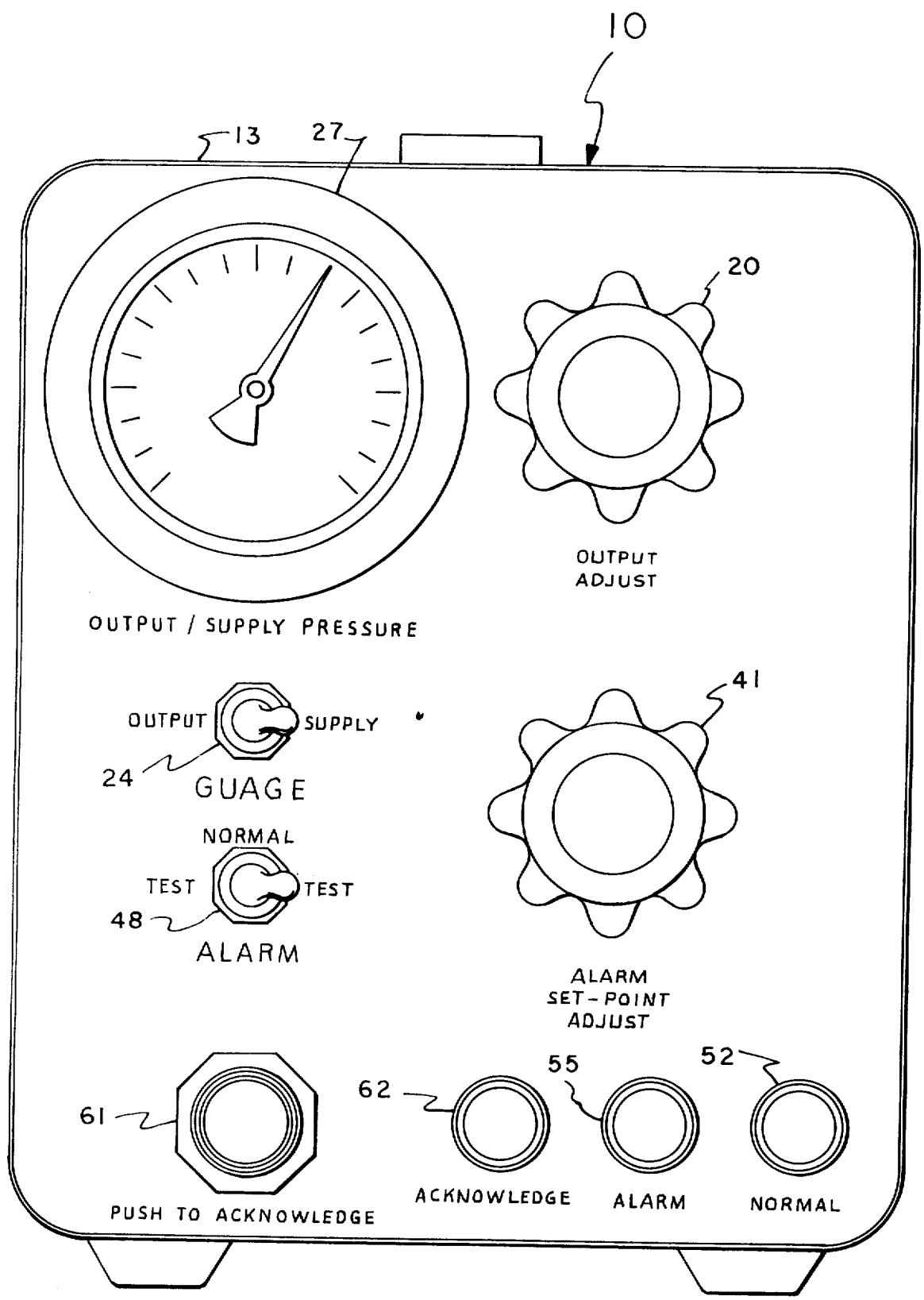
FIG. 1 in the drawings depicts a front elevational view of the present air breather annunciator.
Figure 2:
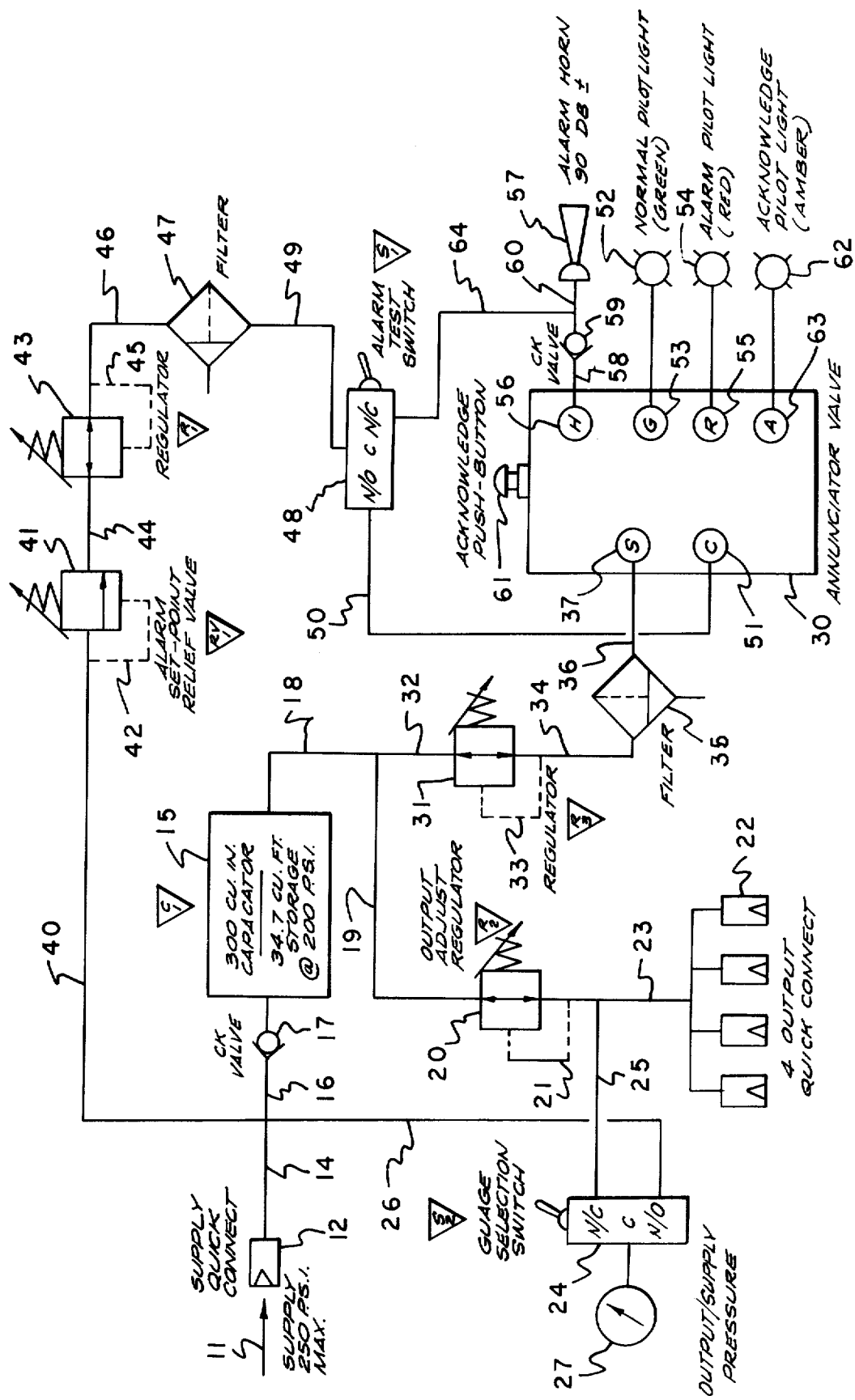
FIG. 2 in the drawings represents a piping schematic showing how the various components of the present device are interconnected.

As shown in FIG. 1 in the drawings, the present air breather annunciator 10 can be conveniently housed in a relatively small cabinet generally not much more than of 1 cubic foot dimension. Referring additionally to FIG. 2, the source 11 of pressurized air, generally at a pressure of 250 pounds per square inch maximum, is furnished to the instrument through the supply quick connect 12 located on the rear of the enclosure 13. The source of air 11 is then fed through the conduit 14 to the air storage capacitor 15, passing through the check valve 17 which prevents the back flow of air through the conduit 14 in the event air pressure is lost, whereby the function of the capacitor 15 would be circumvented. The capacitor 15 is preferably a 300 cubic inch vessel capable of storing 34.7 cubic feet of compressed air at 200 pounds per square inch. This quantity of air will normally allow the workers being serviced by the present air breather annunciator to be able to leave the polluted air environment in which they are working even though the air source 11 has been interrupted, under most working conditions.

Compressed air from the capacitor 15 is fed through the conduits 18 and 19 to the output adjust regulator 20 which is provided with the valve diaphragm downstream tap 21 to enable controlling the pressure at the output quick connects 22 at its desired operational setting. The output adjust regulator 20 adjusts the pressure level to the output quick connect service outlets 22 via the conduit 23. As shown in FIG. 2, four service outlets are preferred which will suffice for most operations.

The gauge selection switch 24 is provided for reading either the output or the supply pressure. This is accomplished by the gauge selection switch 24 which basically comprises a three way valve, one inlet being connected via the conduit 25 to the outlet conduit 23 of the output adjust regulator 20 whereby the normal output pressure, that is, the pressure supplied to the service connections 22, can be readily read. This is the normal closed position of the gauge selection switch 20. The other inlet to the switch 24 is connected to the conduit 14 whereby the supply pressure can be read upon the selective operation of the switch 24. The pressure gauge 27 is provided for reading the pressure selected by the switch 24.

The annunciator valve 30 is provided for energizing the visual and audio low pressure alarms. The valve 30 is energized by virtue of the regulator 31 which is connected to the capacitor 15 by virtue of the conduit 32. The regulator 31 further comprises the downstream tap 33 which connects the diaphragm of the regulator 31 to the conduit 34 whereby once the pressure drops below a certain predetermined level in the conduit 34, the regulator 31 is thereupon caused to open in the manner of operation well known in the arts and allow more air to flow there-through. The filter 35 is connected in line with the conduit 34 and the annunciator valve 30 by virtue of the conduit 36. The filter 35 is provided for preventing any solids from entering the annunciator valve 30 and causing its malfunction.

The alarm circuit comprises the conduit 40 which feeds the supply air pressure 11 to the alarm set-point relief valve 41. The latter further comprises the upstream tap 42 which connects the diaphragm of the alarm set-point relief valve 41 to the conduit 40 whereby upon the pressure dropping below a pre-determined set point in the conduit 40, viz. the supply source 11, the alarm set-point relief valve 41 is caused to close thereby preventing additional air to pass to the regulator 43 via the connecting conduit 44. The reverse operation takes place where the pressure level in the conduit 40 exceeds the desired operating pressure. The air pressure in the alarm circuit is controlled by the regulator 43 which is provided with the downstream pressure tap 45 connecting the diaphragm within the regulator 43 with the conduit 46 so as to control the pressure in the conduit 46. The conduit 46 in turn is connected to the filter 47 which in turn is connected to the alarm test switch 48 via the conduit 49. The filter 47 is provided for screening dirt particles from the air supplied to the annunciator valve 30 to prevent its malfunction.

The alarm test switch 48 in essence is a three way valve having the normally open outlet 50 which in turn is connected to the annunciator valve 30 at the inlet port 51 thereof. With pressure applied at the C port 51, the normal green pilot light or indicator connected to the G port 53 would be actuated and thereby indicate to the operator that the system was ready for use.

Should the pressure in the conduit 40, viz. the air supply source 11, fall below the set point of alarm set-point relief valve 41, then the latter would close thereby de-energizing the circuit established to the annunciator valve 30 via the C port 51 thereof. Accordingly, upon cessation of that source of air pressure within the valve 30, the air entering annunciator or valve 30 via the supply regulator 31 then causes it to internally shift or reposition such that air from the regulator 31 is fed to the H, R and A ports (as described in further detail hereinafter). The red alarm pilot light operably connected to the R port 55 of the annunciator valve would then light up while simultaneously the annunciator valve would feed air from the capacitor 15 circuit to the H port 56 and to the alarm horn 57 via the conduit 58, through the check valve 59 which in turn is connected to the horn 57 via the conduit 60. The visual and audio alarms are silenced upon depressing the acknowledge push-button 61 which will thereupon silence the horn 57 and reverse the position of the indicator 54 while simultaneously causing the amber acknowledge pilot light 62 to light up, the latter being connected to the A connection 63 of the annunciator valve 30. Upon pressure being re-established at the inlet port 51, the system repositions to its normal mode, the amber acknowledge pilot light 62 being extinguished and the normal green pilot light 52 lighting up.

The alarm circuit can be manually checked by positioning the alarm test switch 48 to the common normally closed position whereby air via the conduit 49 is fed through to the horn 57 via the conduit 64.

By way of operation, a worker preparing to perform work in a polluted air atmosphere which requires the use of a hood, would first connect the source of supply air 11 to the quick connect supply connection 12. The pressurized air flows through the conduits 14 and 40 to the alarm set point relief valve 41. When the source of air pressure exceeds the set point of said valve, it opens and passes supply air to the regulator 43 via the conduit 44. The pressure of the supply air is reduced by the regulator 43 and then passes through the filter 47 via conduit 46 whereby any impurities contained are first removed, then through the conduit 49 to the normally opened ports of the alarm test switch 48. The supply of air passing through the alarm test switch 48 is piped via the conduit 50 to the C port 51 of the annunciator valve 30 whereby the alarm 57, green pilot light 52 and red pilot light 54 is energized. When the source of air via the conduit 50 first enters the annunciator valve 30, the normal green pilot light 52 is actuated or lights up.

Simultaneously to energization of the alarm circuit the supply pressure 11 is piped to the capacitator 15 through conduit 16 and the check valve 17. After entering the capacitor 15, the air supply is then allowed to flow via the conduits 18 and 19 to the output adjust regulator 20 which controls the pressure of the air supply to the output quick connects 22, as well as the air flow to the annunciator valve supply regulator 31 via the conduit 32.

The gauge selection switch 24 is manually positioned to indicate either the output or the supply pressure by virtue of its connections to those air sources via the conduit 25 and 26 respectively. Normally, the gauge selection switch 24 is positioned on start up whereby the supply pressure port, that is, the one connected to the conduit 26, is maintained in a normally open position so that the operator can initially observe and read the pressure of the air supply source 11 on start up. The latter must be at a certain minimum before the operator can initiate use of the present device and the air equipment it serves.

The operator should take the precaution before initiating use of the present device and very simply check it for its proper function. This is accomplished by the operator switching the gauge selection switch 24 whereby the normally closed port connected to the conduit 25 is thereupon connected to the output supply pressure gauge 27 which then reads the pressure level in the conduit 23, viz. the output pressure of the output adjust regulator 20 which regulates the pressure to the output quick connect 22. If the pressure reading reflected on the gauge 27 is within the desired operation pressure range, then the operator knows that he has sufficient air pressure at the output quick connects 22 to thereby sustain his air breathing requirements.

As a further safety precaution, the operator would also test the operation of the alarm horn 57 which is performed by switching the alarm test switch 48 so that its normally closed port is connected to the reduced air supply piped to the switch 48 via the conduit 49 whereby reduced air pressure flows to the alarm horn 57 via the conduits 64 and 60. In such fashion, the audible alarm horn 57 is actuated and the operator thereby ascertains that it is in proper working order. The check valve 59 during such tests prevents the back flow of the air supply into the annunciator valve 30 via the connecting conduit 58. Simultaneously with actuation of the alarm horn 57 by flipping of the alarm test switch 48, the flow of air to the C port 51 of the annunciator valve 30 is interrupted whereby the normal green pilot 52 is extinguished and red alarm pilot light 54 is caused to light up. This mode of operation is accomplished with the annunciator valve 30 whenever the pressure applied to the valve at the C port 51 is lost or greatly reduced, that is, to at least the value of that at which the alarm set - point relief valve 41 is set to function as intended. Accordingly, upon cessation of that source of air pressure within the valve 30, the air entering the annunciator valve 30 via the supply regulator 31 then causes it to internally shift or reposition such that air from the regulator 31 is fed to the alarm horn 57 and simultaneously actuating the normal green pilot light or indicator 52 whereby it is unactuated. Also simultaneously, the alarm pilot light or indicator 54 and acknowledged pilot light or indicator 62 are actuated or lit up by virtue of air supplied via the regulator 31 to the R and A ports respectively of the annunciator valve 30 to which said indicators are operably connected. This mode of operation completes the operation of the alarm circuit.

During normal operation, the above sequence of events would indicate to an operator that the source of air 11 has either ceased or been diminished to the point that it will not be safe to conduct his operation, that is, he will encounter breathing difficulty. However, during the initial phase of such an occurrence, the operator will have a certain amount of air stored in the capacitor 15 to enable him to safely shut down his operation and make an orderly exit. The above sequence of events also indicates to the operator that the supply pressure at the alarm set-point relief valve 41 has fallen below its control set point whereby the valve has closed disabling the annunciator valve control circuit as indicated by the audio and visible alarms in the manner discussed in detail above.

Assuming the above sequence of events, the operator would then return to the work station where the present device is positioned and wait or correct the failure of the air supply source as indicated to the operator by the supply pressure gauge selection switch 24 being in its closed position as shown in FIG. 2 of the drawings.

When the operator returns to the present annunciator and thus out of danger, he would normally silence the audio and visual alarms by depressing the acknowledge push button 61. In such fashion, the alarm horn 57 is silenced, the red alarm pilot light 54 goes out and the acknowledge amber pilot light 62 is turned on. Conversely, when the control pressure is re-established at the C port 51 of the annunciator valve 30, the entire system repositions to its normal mode as described in detail above.

The various components of the present annunciator device are old and well known, being conventionally available in the art. For example, the alarm set-point relief valve 41 comprises merely a standard type of pneumatically actuated relief valve capable of positive flow control responsive to the upstream pressure level in the conduit 40, viz. that of the air supply 11. The valve 41 is generally a self-operated indirect action valve and due to its nature of operation, would generally be described as an on-off control valve since its function is not to throttle, but rather to shut off the flow of air to the annunciator valve control in a somewhat positive manner once the supply air reaches the alarm set-point of the valve. Otherwise, it would tend to delay the function of the present device to the extent that the capacitor may be dangerously bled down to the extent that it may not have sufficient air to function as intended. The valve 41 is preferably a small compact self-contained positive action control valve having a single port indirect action mechanism. Of course, a single port split body design could be employed having a separate valve actuator. In short, the valve 41 can be any commercially available valve or controller that gives a response that is strictly determined by the direction of deviation of pressure in the conduit 40 and which imparts a final valve position that bears no relation to the value of a variable, hence it merely floats on the line and shuts off air supply to the annunciator valve control when the air supply 11 reaches a minimum pressure.

The pneumatic regulators 43, 31 and 20 are standard types of air regulators commercially available. Any regulator that is capable of selecting the desired pressure level from a continuous range of different possible pressure levels would be suitable. In short, any regulator that is capable of simply throttling air flow through it can be utilized. A relieving compact type of general purpose or miniature regulator comprising a flexible diaphragm which controls a valve mechanism through an interconnected valve pin and an adjusting spring which is loaded by means of an adjusting screw, is preferred.

The annunciator valve 30 is preferably a self-contained annunciator circuit designed to monitor a pneumatic signal which may represent any of a multitude of process variables. The valve is provided with a selection of outputs which announce the state of the monitored signal. The outputs indicate signal present, signal absent, and signal absent but acknowledged. An auxiliary audio alarm output is provided in the signal absent condition. When the signal absent condition is acknowledged manually, the auxiliary audio alarm output is thereby removed.

As available in the trade, such an annunciator valve would comprise a fluidic module comprising an "or-nor" key module defining a valve logic having a NOR gate and an AND gate whereby when the signal at the C 51 port is present, port G 53 would be at high pressure and all other outputs would be off. Upon setting the acknowledge memory, the annunciator circuit would then become armed. When the signal at port C 51 would be lost, then the output to the G 53 port would be turned off and the NOR gate enabled thereby yielding output at the R 55 and H 56 ports. This would represent the active alarm condition. When this condition would be manually acknowledged, the acknowledge memory would thereby be set. Setting the memory would disable the NOR gate, extinguishing the alarm and enabling the AND gate. The AND gate would yield an output indicating an acknowledged alarm. When the signal at port C 51 would be restored, the AND gate would be disabled, the G 53 port output restored, and the acknowledged memory would then be reset to await the next alarm condition. This operable relationship is realized by connecting the NOR and AND gates in parallel with each other across the C and G ports and in series with the acknowledge memory which in turn is actuated by the manual acknowledge. The output of the NOR gate is operably connected to the R and H ports and that of the AND gate to the A port. Supply air is furnished via the S port.

The annunciator valve 30 can also comprise a combination of other standard pneumatic actuated components, such as pressure responsive electrical switches, and the like.

The switches 24 and 48 can comprise any commercially available pneumatic three-way flow control valve, such as a plug valve, whereby a common port of the valve can be operably connected in a flip-flop fashion to either one of two remaining ports upon manipulation of the valve.

The quick connects 12 and 22 are standard compressed air back pressure to close air couplings which basically comprise female and male components together with spring actuated interlocking members and seals whereby the female and male members can be bayonetted together and form an air tight connection, all as well known in the art.

The pilot light or indicators can be any suitable means for indicating a change in system pressure, however, pneumatic visual indicators readily available in the trade which are designed for use in fluidic and miniature pneumatic circuits are preferred. Such as device is comprised miniature cylindrical housing enclosing a diaphragm that is backed by a piston which rotates a ball through a connecting rod. The ball being half one color and half a contrasting color indicates the presence or absence of a signal. A spring returns the piston and rotates the ball to the normal position.

The check valves 16 and 59 are standard ball actuated spring loaded one-way flow control check valves commercially available. Likewise, the air filters 35 and 37 are commercially available and generally comprise a fine mesh wire screen capable of screening out particles which might hinder or interrupt the operation of the annunciator valve 30.

The capacitor 15 is a standard vessel capable of withstanding 250 pounds per sqaure inch pressure and of a capacity preferably of about 34.7 cubic feet.

The alarm horn 57 can be any air operated audible signal device such as an air siren having an air actuating impeller or a simple air whistle. The pressure gauge 27 is a standard Bourdon tube pressure gauge capable of reading up to a pressure range slightly greater than that of the air source 11, for example, 350 pounds per square inch.

The materials of construction of the present invention are not critical as long as they are sufficiently strong and of a material that is compatible with air service.

In light of the above, it will be apparent to one skilled in the art that various changes and modifications can be made in the above device as well as in its mode of operation without departing from the true scope and spirit of the present invention. Accordingly, what I intend to encompass within the ambit of my invention is that as set forth and particularly pointed out in the appended claims.

I claim:
1. Air breather annuniciator means comprising:
   a. air storage capacitor means adapted for being operably connected to a source of supply air;
   b. air output regulator means connected in series with said air storage capacitor means for regulating the pressure of air supplied from said air storage capacitor means to an air demand operational station means;
   c. first conduit means operably connecting said air storage capacitor means with said air output regulator means;
   d. said air demand operational station means adapted for being operably connected to equipment requiring a source of pressure regulated air for life support;
   e. second conduit means operably connecting said air output regulator means with said air demand operational station means;
   f. annunciator means comprising alarm circuit means connected in parallel with said air demand station means at least across said air storage capacitor means for indicating an interruption of air flow to said air storage capacitor means, said alarm circuit means being further defined as comprising pressure sensing means for pneumatically sensing pressure variation and selectively actuated alarm means for indicating pressure changes from a predetermined set point as indicated by said pressure sensing means; and
   g. third conduit means operably connecting said alarm circuit means across the output of said air storage capacitor means.

2. The air breather annunciator means of claim 1 further characterized in that said alarm circuit means further comprises:
   annunciator valve means operably connected and paralleled across said capacitor means, said annunciator valve means being further defined in that upon an interruption of air flow to said air storage capacitor means, means in said annunciator means repositions whereby said alarm circuit means actuates said alarm means.

3. The air breather annunciator means of claim 2 further characterized in that said annunciator valve means is further defined as comprising:
   a third input regulator sensor means operably connected in series with said third conduit means for actuating said annunciator valve means; and
   alarm circuit input regulator means operably connected in series with said annunciator valve means for actuating said alarm circuit.

4. The air breather annunciator means of claim 3 wherein said alarm means is further defined as comprising audio and visual alarm means.

5. The air breather annunciator means of claim 4 further characterized as comprising:
   output/supply pressure gauge means operably connected in parallel across said capacitor and said output regulator means for selectively indicating the pressure level of the air supply source or the output pressure level of said output regulator means.

6. The air breather annunciator means of claim 5 further characterized in that said alarm circuit means further comprises:
   an alarm test circuit further defined as including alarm test switch means operably connected to an air input to said annunciator valve means and to said audio alarm means whereby said annunciator valve means can be by-passed and said audio alarm means individually checked for its proper operation.

7. The air breather annunciator means of claim 6 further characterized in that said annunciator valve means is further defined as comprising:
   a self-contained annunciator circuit capable of monitoring at least one pneumatic signal which represents a multitude of process variables, said valve being provided with a selection of outputs for announcing the state of the monitored signal, said outputs indicating signal present, signal absent, and signal absent but acknowledged, said audio alarm means being operably connected to said signal absent output such that when said signal absent output is acknowledged manually, said audio alarm output is thereby removed.

* * * * *